United States Patent
Watanabe et al.

(10) Patent No.: US 11,521,120 B2
(45) Date of Patent: Dec. 6, 2022

(54) INSPECTION APPARATUS AND MACHINE LEARNING METHOD

(71) Applicant: FANUC Corporation, Yamanashi (JP)

(72) Inventors: Keisuke Watanabe, Yamanashi (JP); Yasuhiro Shibasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 430 days.

(21) Appl. No.: 16/566,881

(22) Filed: Sep. 11, 2019

(65) Prior Publication Data

US 2020/0082297 A1  Mar. 12, 2020

(30) Foreign Application Priority Data

Sep. 12, 2018 (JP) .............................. JP2018-170913

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS

| 4,580,226 A * | 4/1986 | Bennison ................ G07C 3/14 700/219 |
| 5,577,166 A * | 11/1996 | Mizuno .................... G06N 3/08 706/11 |
| 6,234,869 B1 * | 5/2001 | Kobayashi ............. B23Q 15/02 451/10 |
| 6,539,106 B1 * | 3/2003 | Gallarda .............. G06K 9/6202 382/149 |
| 2006/0010166 A1 * | 1/2006 | Lin ........................ G06Q 30/06 |
| 2007/0265743 A1 | 11/2007 | Kojitani et al. |

(Continued)

FOREIGN PATENT DOCUMENTS

| JP | 2002268742 A | 9/2002 |
| JP | 2005-52926 A | 3/2005 |

(Continued)

*Primary Examiner* — Li B. Zhen
*Assistant Examiner* — Leah M Feitl
(74) *Attorney, Agent, or Firm* — Hauptman Ham, LLP

(57) ABSTRACT

An inspection apparatus of the present disclosure includes: a machine learning device that performs machine learning on a basis of state data acquired from an inspection target and label data indicating an inspection result related to the inspection target to generate a learning model; a learning model evaluation index calculation unit that calculates a learning model evaluation index related to the learning model generated by the machine learning device as an evaluation index to be used to evaluate the learning model; an inspection index acquisition unit that acquires an inspection index to be used in the inspection; and a learning model selection unit that displays the learning model evaluation index and the inspection index so as to be comparable with each other regarding the learning model generated by the machine learning device, receives selection of the learning model by an operator, and outputs a result of the selection.

14 Claims, 4 Drawing Sheets

(56) References Cited

U.S. PATENT DOCUMENTS

| | | | |
|---|---|---|---|
| 2011/0182495 A1* | 7/2011 | Sun | G06T 7/48 |
| | | | 382/141 |
| 2014/0050389 A1* | 2/2014 | Mahadevan | G06T 7/0004 |
| | | | 382/149 |
| 2014/0314302 A1 | 10/2014 | Minato et al. | |
| 2017/0140537 A1* | 5/2017 | Jia | G06T 7/30 |
| 2021/0053170 A1* | 2/2021 | Sim | G05B 19/4065 |
| 2021/0229231 A1* | 7/2021 | Fukatsu | G05B 19/406 |

FOREIGN PATENT DOCUMENTS

| | | | | |
|---|---|---|---|---|
| JP | 2006293820 A | * | 10/2006 | |
| JP | 2006293820 A | | 10/2006 | |
| JP | 2007327937 A | | 12/2007 | |
| JP | 2010211468 A | | 9/2010 | |
| JP | 2010249547 A | | 11/2010 | |
| JP | 2013015964 A | * | 1/2013 | |
| JP | 2013-140090 A | | 7/2013 | |
| JP | 2014206415 A | * | 10/2014 | H01G 2/14 |
| JP | 2015-21756 A | | 2/2015 | |
| JP | 2017-49974 A | | 3/2017 | |
| JP | 6680430 B1 | * | 4/2020 | |
| JP | 6684777 B2 | * | 4/2020 | |

\* cited by examiner

INSPECTION APPARATUS AND MACHINE LEARNING METHOD

RELATED APPLICATIONS

The present application claims priority to Japanese Patent Application Number 2018-170913 filed Sep. 12, 2018, the disclosure of which is hereby incorporated by reference herein in its entirety.

BACKGROUND OF THE INVENTION

1. Field of the Invention

The present invention relates to an inspection apparatus and a machine learning method.

2. Description of the Related Art

Conventionally, appearance inspections have been performed in which operators visually confirm the appearance of products manufactured at manufacturing sites such as factories to classify the products into non-defective products and defective products having scratches, cracks, or the like. In such appearance inspections, inspection accuracy could fluctuate because the determination reference is different depending on the levels of experience of operators, or because inspections are performed with lack of concentration due to changes in physical conditions. In such cases, non-defective products could be extracted from manufacturing lines as defective products. Therefore, at many sites, products determined to be defective products and temporarily removed from manufacturing lines are inspected again by other persons in charge of inspections. As a result of the inspection, products determined to be non-defective products are returned to the manufacturing lines again. Thus, reduction in manufacturing yields is prevented. In a similar manner, workpieces determined to be non-defective products by operators could actually be defective products. In this case, the defective products are shipped as non-defective products. Therefore, at manufacturing sites, various countermeasures are taken to reduce the rate of defective products included in shipped products (defective product shipping rate) to a greater extent.

Generally, it is important to reduce two indexes to automate appearance inspections at manufacturing sites. The first index is the above mentioned "defective product shipping rate," and the second index is a "re-inspection rate." The re-inspection rate indicates the rate of the number of products excluded from manufacturing lines as defective products to the number of products manufactured in the manufacturing lines. That is, a reduction in the re-inspection rate indicates reducing an operation frequency of the confirmation operations for reconfirming whether products to be handled as non-defective products have been included in products removed from manufacturing lines as defective products. These indexes depend on the number of defective products relative to the total number of manufactured inspection targets ("manufacturing defective rate"). Therefore, if the "manufacturing defective rate" of a certain manufacturing line is known, it is only required to construct an inspection apparatus capable of performing an inspection satisfying a maximum "defective product shipping rate" (limit defective product shipping rate) and a maximum "re-inspection rate" (limit re-inspection rate indicating the rate of inspection targets excluded from an inspection to the total number of inspection targets).

Meanwhile, as an attempt to improve accuracy in an automated appearance inspection, an inspection is performed in which an image of the appearance of a product is captured by an image-capturing unit and the product is sorted on the basis of the captured image. Further, an appearance inspection in which a product is mechanically classified into a non-defective product and a defective product on the basis of a captured image has been performed (see, for example, Japanese Patent Application Laid-open No. 2015-021756, Japanese Patent Application Laid-open No. 2005-052926, and Japanese Patent Application Laid-open No. 2013-140090). In such a mechanical appearance inspection, feature points are extracted from a reference image prepared in advance. Next, the feature points extracted from the reference image are compared with feature points extracted from a captured image of a product. Finally, the product is sorted or selected on the basis of a result of the comparison. Further, cases in which machine learning is introduced into such a mechanical appearance inspection has increased (for example, Japanese Patent Application Laid-open No. 2017-049974).

Generally, in machine learning, particularly deep learning using a neural network having three or more layers, a learning model is generated in a learning cycle called iterations or epochs. Further, a learning model is generated every time a calculation is performed by a certain degree of cycles. This is because deep learning has a property in which the quality of a learning model is not improved unlimitedly as the learning is advanced. That is, a learning model that has performed learning by a certain number of cycles or more could be put into a state called overfitting. The learning model in this state is not able to output a correct result with respect to unknown data. Therefore, in deep learning, multiple learning models are generated in a learning process, and each of the learning models is evaluated. Then, an optimum learning model is selected from among the evaluated learning models. In the evaluation of the learning models, a value such as "loss" (an error between an output value of a neural network and an answer given by training data) or "accuracy" (the correct answer rate of an output value of the neural network) at the time of learning is used. Further, "precision" (the rate of actually-correct data to data predicted to be correct) or "recall" (the rate of correctly-found data to data to be found) at the time of evaluating verification data may be used.

However, when machine learning is used in an appearance inspection at a manufacturing site, a learning model is required to satisfy each of evaluation criteria (specifications requested by a user) used at the site such as the above mentioned defective product shipping rate and the re-inspection rate. That is, even if a determination is made as to whether a learning result is good or bad on the basis of the evaluation criterion of a general learning model, it is unknown that the evaluation criterion requested on site is satisfied. For example, even if the "loss" indicating one of indexes at the time of learning reduces, an expected defective product shipping rate may not be necessarily achieved by the learning model. That is, a method for easily understanding or calculating values of the above mentioned "loss" and the "accuracy" with which the "defective product shipping rate" and the "re-inspection rate" satisfy on-site requirements has not been proposed.

Accordingly, the objective of the present disclosure is to provide an inspection apparatus and a machine learning method that make it easier for users at manufacturing sites to select a learning model satisfying required specifications.

SUMMARY OF THE INVENTION

In the present disclosure, an inspection apparatus employs a configuration that determines whether a learning model is good or bad on the basis of the relationship between an index value for evaluating the performance of the learning model and an index value required on site with respect to an inspection apparatus, and that selects the learning model on the basis of a result of the determination to solve the above problem.

According to an aspect of the present disclosure, provided is an inspection apparatus that performs an inspection of an inspection target, the inspection apparatus including: a machine learning device that performs machine learning on a basis of state data acquired from the inspection target and label data indicating an inspection result related to the inspection target to generate a learning model; a learning model evaluation index calculation unit that calculates a learning model evaluation index related to the learning model generated by the machine learning device as an evaluation index to be used to evaluate the learning model; an inspection index acquisition unit that acquires an inspection index to be used in the inspection; and a learning model selection unit that displays the learning model evaluation index and the inspection index so as to be comparable with each other regarding the learning model generated by the machine learning device, receives selection of the learning model by an operator, and outputs a result of the selection.

According to another aspect of the present disclosure, provided is a machine learning method including: a first step of performing machine learning on a basis of state data acquired from an inspection target and label data indicating an inspection result related to the inspection target to generate a learning model; a second step of calculating a learning model evaluation index related to the learning model generated in the first step as an evaluation index used to evaluate the learning model; a third step of acquiring an inspection index used in an inspection; and a fourth step of displaying the learning model evaluation index and the inspection index so as to be comparable with each other regarding the learning model generated in the first step, receiving selection of the learning model by an operator, and outputting a result of the selection.

According to the present disclosure, it is possible to determine the evaluation of a learning model on the basis of required specifications fixed as inspection indexes. Therefore, in the learning process of a machine learning device, even an operator on site having no knowledge about machine learning is allowed to determine whether learning has been performed to satisfy required specifications fixed as currently-set inspection indexes and easily select an appropriate learning model.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Hereinafter, embodiments of the present disclosure will be described with reference to the drawings.

Figure 1:
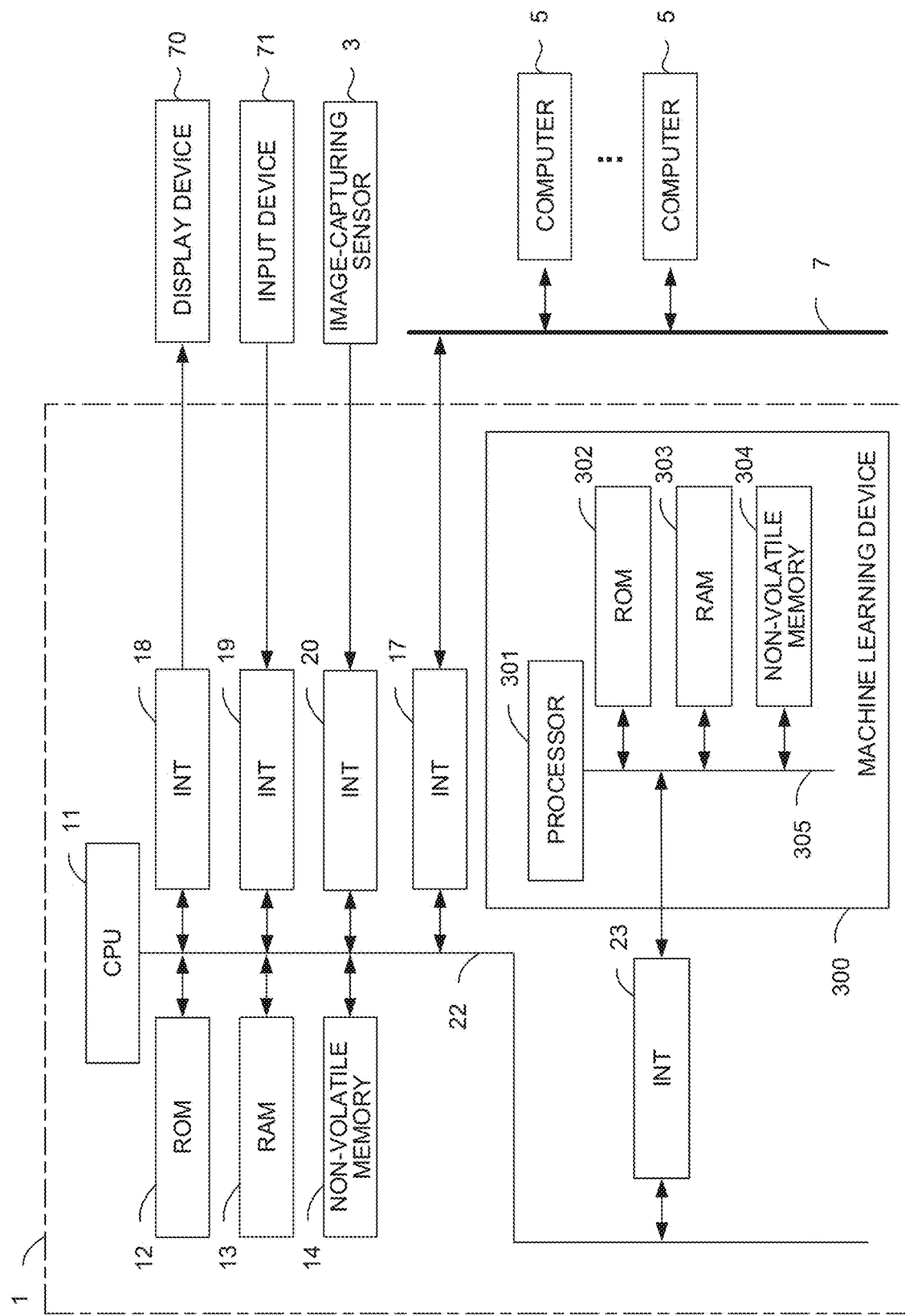
FIG. 1 is a schematic hardware configuration diagram showing an inspection apparatus according to an embodiment.

FIG. 1 is a schematic hardware configuration diagram showing an inspection apparatus according to an embodiment of the present disclosure. An inspection apparatus 1 of the present embodiment is implemented in, for example, a computer installed on a product inspection site in a factory. Further, the inspection apparatus 1 may be implemented as a computer such as a cell computer, a host computer, an edge computer, and a cloud server connected to a computer installed on a product inspection site in a factory via a network. FIG. 1 shows an example of a case in which the inspection apparatus 1 is implemented in a computer installed on a product inspection site in a factory.

A central processing unit (CPU) 11 provided in the inspection apparatus 1 according to the present embodiment is a processor that entirely controls the inspection apparatus 1. The CPU 11 reads a system program stored in a read only memory (ROM) 12 connected via a bus 22. The CPU 11 controls the entire inspection apparatus 1 according to the system program. In a random access memory (RAM) 13, temporary calculation data or display data to be displayed on a display device 70 is stored. Further, in the RAM 13, various data, or the like input by an operator via an input device 71 is stored via an interface 19.

A non-volatile memory 14 is constituted by, for example, a static random access memory (SRAM), a solid state drive (SSD), or the like backed up by a battery not illustrated. The non-volatile memory 14 is a memory that maintains its storage state even if the power of the inspection apparatus 1 is turned off. In the non-volatile memory 14, data or a program input via the input device 71 is stored. Further, in the non-volatile memory 14, image data or the like of an inspection target captured by an image-capturing sensor 3 via an interface 20 is stored. The data, the program, or the like stored in the non-volatile memory 14 may be loaded into the RAM 13 when used. Further, in the ROM 12, a system program for performing processing related to an inspection or a system program for performing other required processing is written in advance.

The image-capturing sensor 3 is an electronic camera having an imaging element such as a charge coupled device (CCD). The image-capturing sensor 3 is a well-known light-receiving device having a function of detecting a two-dimensional image or a distance image on an imaging surface (CCD array surface) by capturing an image. The image-capturing sensor 3 is attached to, for example, a hand of a robot not illustrated. The image-capturing sensor 3 is moved by the robot to an imaging position at which an image of an inspection target is to be captured. The image-capturing sensor 3 sends image data obtained by capturing an image of the inspection target to the CPU 11 via the interface 20. The image-capturing sensor 3 may be fixedly installed at, for example, a prescribed position. In this case, the inspection target held by the hand of the robot is moved to a position at which capturing of an image of the inspection target by the image-capturing sensor 3 is allowed. Thus, the image-capturing sensor 3 is allowed to capture an image of the inspection target. Control related to the capturing of an image of the inspection target by the image-capturing sensor 3 may be performed when the inspection apparatus 1 executes a program, or may be performed by a robot controller that controls the robot or control by other apparatuses.

An interface 17 connects the inspection apparatus 1 to a wired/wireless network 7. The network 7 is connected to a computer 5 such as a personal computer, a cell computer, an edge computer, and a host computer installed side by side with a machine tool installed in a factory. The inspection apparatus 1 and the computer 5 exchange information each other via the network 7.

An interface 23 connects the bus 22 of the inspection apparatus 1 and a machine learning device 300 to each other. In the machine learning device 300, a processor 301 that controls the entire machine learning device 300, a ROM 302 that stores a system program or the like, a RAM 303 that temporarily stores data in each processing related to machine learning, and a non-volatile memory 304 that is used to store a learning model or the like are connected to each other via a bus 305. The machine learning device 300 observes each information acquirable by the inspection apparatus 1 via the interface 23. Further, the inspection apparatus 1 performs subsequent processing on the basis of the inference of an inspection result related to an inspection target output from the machine learning device 300.

Figure 2:
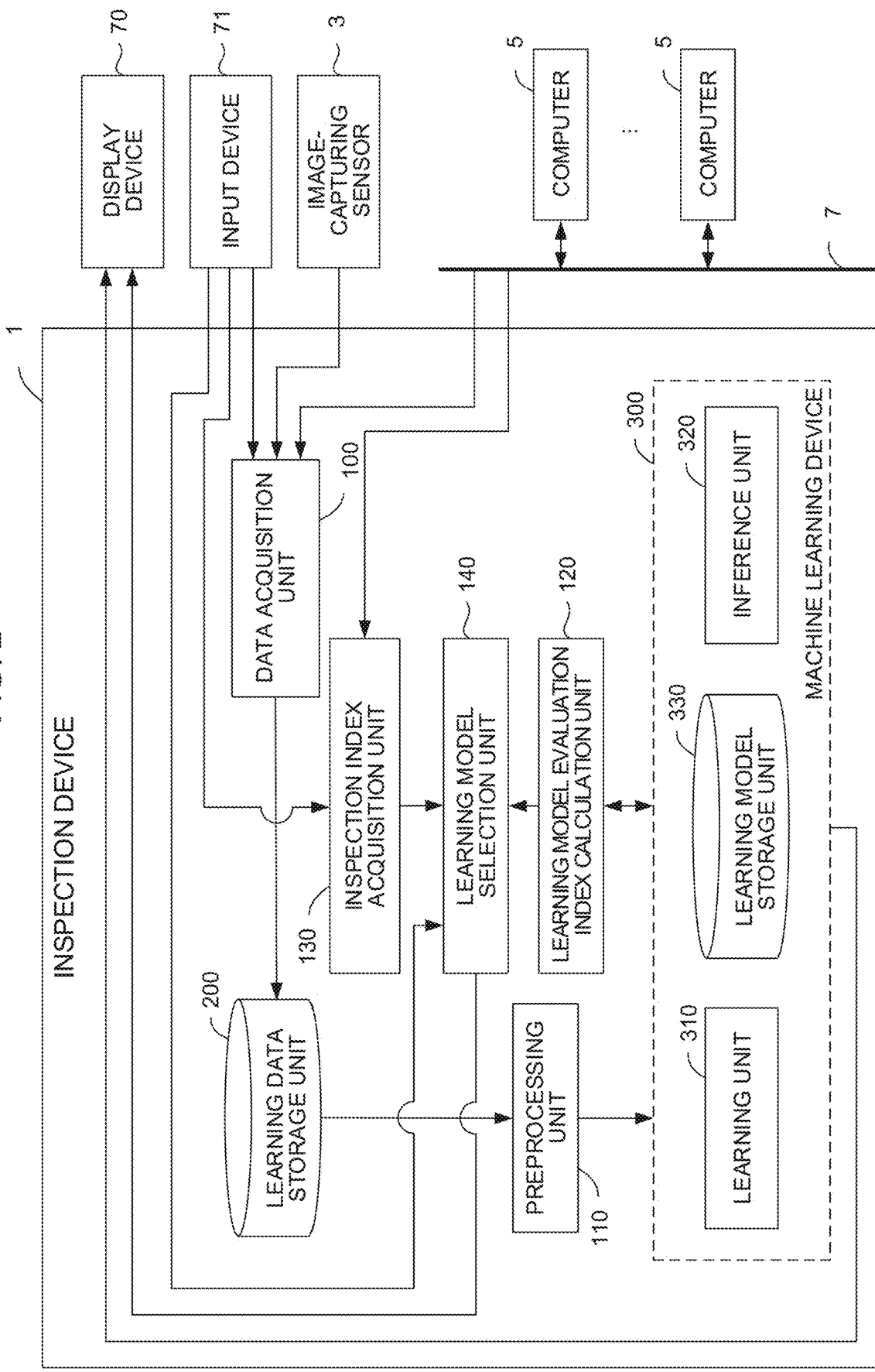
FIG. 2 is a schematic function block diagram of the inspection apparatus according to the embodiment.

FIG. 2 is a schematic function block diagram of the inspection apparatus 1 according to the embodiment. The respective functions of function blocks illustrated in FIG. 2 are realized when the CPU 11 provided in the inspection apparatus 1 and the processor 301 of the machine learning device 300 illustrated in FIG. 1 execute their system programs to control the operations of the respective units of the inspection apparatus 1 and the machine learning device 300.

The inspection apparatus 1 of the present embodiment includes a data acquisition unit 100, a preprocessing unit 110, a learning model evaluation index calculation unit 120, an inspection index acquisition unit 130, and a learning model selection unit 140. The machine learning device 300 provided in the inspection apparatus 1 includes a learning unit 310, and an inference unit 320. Further, on the non-volatile memory 14, a learning data storage unit 200 that stores data for learning and inference performed by the machine learning device 300 is provided. On the non-volatile memory 304 of the machine learning device 300, a learning model storage unit 330 that stores a learning model constructed by machine learning performed by the learning unit 310 is provided.

The data acquisition unit 100 is a function unit that acquires various data input from the image-capturing sensor 3, the input device 71, the computer 5, or the like. The data acquisition unit 100 acquires, for example, image data on an inspection target captured by the image-capturing sensor 3 and stores the acquired image data in the learning data storage unit 200. Further, the data acquisition unit 100 acquires various data such as label data indicating a result obtained when an operator visually inspects the inspection target and learning data (image data on an inspection target and the label of an inspection result of the inspection target) acquired from the computer 5 and stores the acquired various data in the learning data storage unit 200. The data acquisition unit 100 may acquire data from an external storage device not illustrated.

The preprocessing unit 110 generates, on the basis of learning data stored in the learning data storage unit 200, training data T that is the combination of state data S and label data L for learning in the machine learning device 300. The preprocessing unit 110 generates the state data S and the label data L by converting (performing the digitization, normalization, sampling, or the like of) the acquired data into a unified form that can be handled by the machine learning device 300.

The state data S generated by the preprocessing unit 110 includes at least inspection target image data S1 acquired when an image of an inspection target is captured. The inspection target image data S1 may be, for example, array data on pixel values of pixels constituting an image obtained by capturing an image of an inspection target.

Further, the label data L generated by the preprocessing unit 110 includes at least inspection result data L1 including the label of an inspection result of an inspection target. The inspection result data L1 may be, for example, a label indicating a result obtained when an operator visually inspects an inspection target.

The learning unit 310 performs supervised learning using the state data S and the label data L generated by the preprocessing unit 110. The learning unit 310 is a function unit that generates (learns) a learning model that has learned an inspection result of an inspection target with respect to image data on the inspection target. The learning unit 310 of the present embodiment may be configured to perform, for example, supervised learning using a neural network as a learning model. When the learning unit 310 is configured like this, the learning model may be a neural network including the three layers of an input layer, an intermediate layer, and an output layer. Further, the learning model may be a neural network including three or more layers. That is, the learning unit 310 may use deep learning as a method. By using deep learning, the learning unit 310 is allowed to perform more effective learning and a deduction. The learning model generated by the learning unit 310 is stored in the learning model storage unit 330 provided on the non-volatile memory 304. Further, the learning model is used for performing the inference processing of an inspection result based on image data on an inspection target by the inference unit 320.

The inference unit 320 performs, on the basis of the state data S input from the preprocessing unit 110, the inference of an inspection result of an inspection target using a learning model stored in the learning model storage unit 330. In the inference unit 320, the state data S (the inspection target image data S1) input from the preprocessing unit 110 is input as input data to a learning model (in which parameters have been determined) generated by supervised learning by the learning unit 310. Thus, the inspection result of the inspection target is estimated (calculated). The inspection result of the inspection target estimated by the inference unit 320 is output to, for example, the display device 70 via the interface 18. Further, the inspection result of the inspection target may be output to, for example, the computer 5 such as a host computer and a cloud computer via the network 7 to be used.

The learning model evaluation index calculation unit 120 is a function unit that calculates a learning model evaluation index for evaluating a learning model stored in the learning model storage unit 330. The learning model evaluation index calculation unit 120 performs a receiver operating characteristic (ROC) analysis, for example, on a learning model stored in the learning model storage unit 330 and generates an ROC curve as a learning model evaluation index. In FIG.

Figure 3:
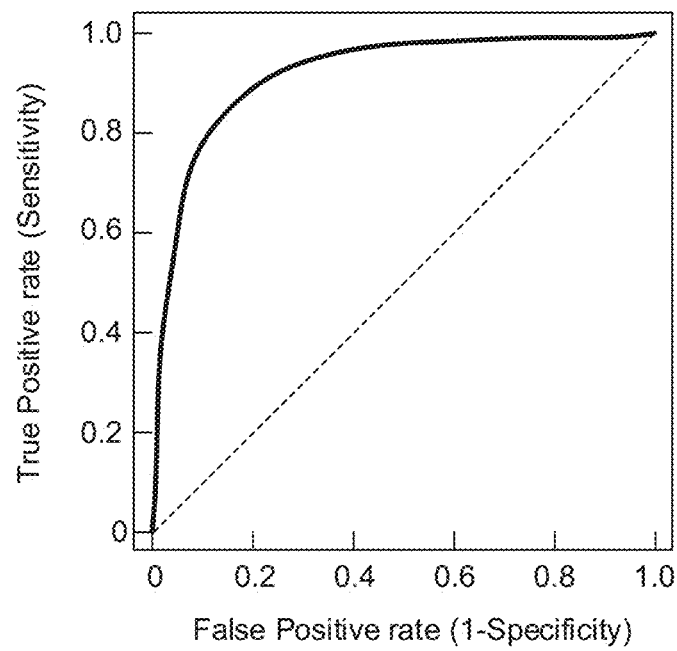
FIG. 3 is a diagram showing an example of an ROC curve.

3, a vertical axis indicates a true positive rate (a probability that positivity is accurately predicted), and a horizontal axis indicates a false positive rate (a probability that negativity is falsely predicted as positivity). The ROC curve is a curve (a solid line drawn by a thick line in FIG. 3) drawn when the threshold of an output value of a learning model that estimates an inspection target as being positive is changed when an inspection is performed by a certain learning model. The learning model evaluation index calculation unit 120 may evaluate a learning model using learning data (the state data S and the label data L) not being used to learn the learning model among the learning data stored in the learning data storage unit 200. Note that although an example in which the ROC curve is used is described in the present embodiment, an index for evaluating a learning model other than the ROC curve may be used in the inspection apparatus 1.

The learning model evaluation index calculation unit 120 may evaluate a learning model every time the learning unit 310 performs learning a predetermined number of times. Further, the learning model evaluation index calculation unit 120 may store the back up of a learning model that has been evaluated in the learning model storage unit 330 together with an evaluation result of the learning model. For example, when a learning model is designed to be evaluated every 1,000 learning cycles in advance, the learning model evaluation index calculation unit 120 calculate a learning model evaluation index every 1,000 learning cycles such as when learning is performed 1,000 times, 2,000 times, 3,000 times, or the like. The learning model evaluation index calculation unit 120 stores the learning models and the learning model evaluation indexes at each point in the learning model storage unit 330 so as to be associated with each other (separately from a learning model that successively performs learning).

The inspection index acquisition unit 130 is a function unit that acquires an inspection index used on an inspection site by the inspection apparatus 1. The inspection index acquisition unit 130 may acquire, for example, an inspection index value input by an operator via the input device 71. The inspection index acquisition unit 130 may acquire, via the network 7, an inspection index from the computer 5 such as a host computer in which information on a production plan in a factory or the like is managed. Examples of an inspection index acquired by the inspection index acquisition unit 130 include a limit defective product shipping rate, a limit re-inspection rate, or the like.

The learning model selection unit 140 is a function unit that displays a learning model evaluation index and an inspection index of each learning model on the display device 70 so as to be comparable with each other on the basis of the learning model evaluation index calculated by the learning model evaluation index calculation unit 120 and the inspection index acquired by the inspection index acquisition unit 130 regarding a plurality of learning models, and lets an operator to select a learning model to be used for an inspection. The learning model selection unit 140 displays a learning model evaluation index and an inspection index related to each learning model on the display device 70 so as to be comparable with each other on the basis of a previously-set index value comparison display form. Then, the learning model selection unit 140 selects a learning model selected via the input device 71 as a learning model to be used for an inspection by referring to the learning model evaluation index and the inspection index related to the learning model displayed by an operator on the display device 70. The learning model selection unit 140 instructs to store the selected learning model in the learning model storage unit 330. Further, the learning model selection unit 140 outputs a result of the selection to be displayed on the display device 70, or outputs the same to another computer 5 such as a host computer and a cloud computer via the network 7.

Figure 4:
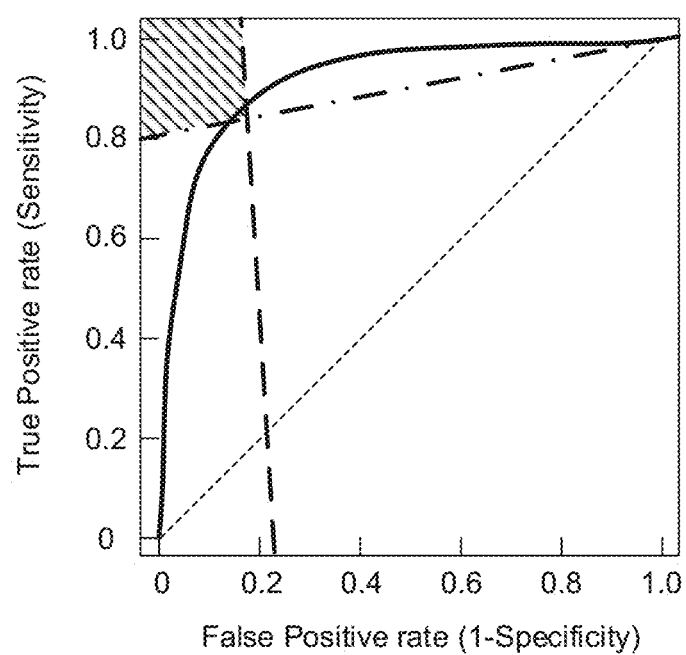
FIG. 4 is a diagram describing the relationship between the ROC curve, a limit defective product shipping rate, and a limit re-inspection rate.

A case in which an ROC curve is used as a learning model evaluation index and a limit defective product shipping rate and a limit re-inspection rate are used as inspection indexes in the display processing of the learning model selection unit 140 will be described. FIG. 4 is a graph in which limit lines satisfying a limit defective product shipping rate and a limit re-inspection rate are plotted with respect to an ROC curve. In FIG. 4, a chain line drawn by thick lines is obtained by plotting values calculated according to the following Formula (1) on the graph on the basis of the limit defective product shipping rate. A region on the upper side of the chain line shows a region in which the limit defective product shipping rate is satisfied. Note that a manufacturing defective rate is assumed to be known in advance on the basis of past statistics or the like.

$$F(f)=1-\{d\times(1-m)\times(1-f)\}/\{m\times(1-d)\} \quad (1)$$

f: False positive rate
d: Limit defective product shipping rate
m: Manufacturing defective rate Meanwhile, in FIG. 4, a broken line drawn by thick lines is obtained by plotting values calculated according to the following Formula (2) on the graph on the basis of the limit re-inspection rate. A region on the left side of the broken line shows a region in which the limit re-inspection rate is satisfied. Note that a manufacturing defective rate is assumed to be known in advance on the basis of past statistics.

$$G(t)=\{r-(m\times t)\}/(1-m) \quad (2)$$

t: True positive rate
r: Limit re-inspection rate
m: Manufacturing defective rate That is, if a learning model has an ROC curve entering a hatched region in FIG. 4, a threshold corresponding to a portion entering the region (the threshold of an output value of the learning model that estimates an inspection target as being positive, i.e., a defective product) is set and used, whereby the learning model may be used as one satisfying required specifications fixed as inspection indexes.

Figure 5:
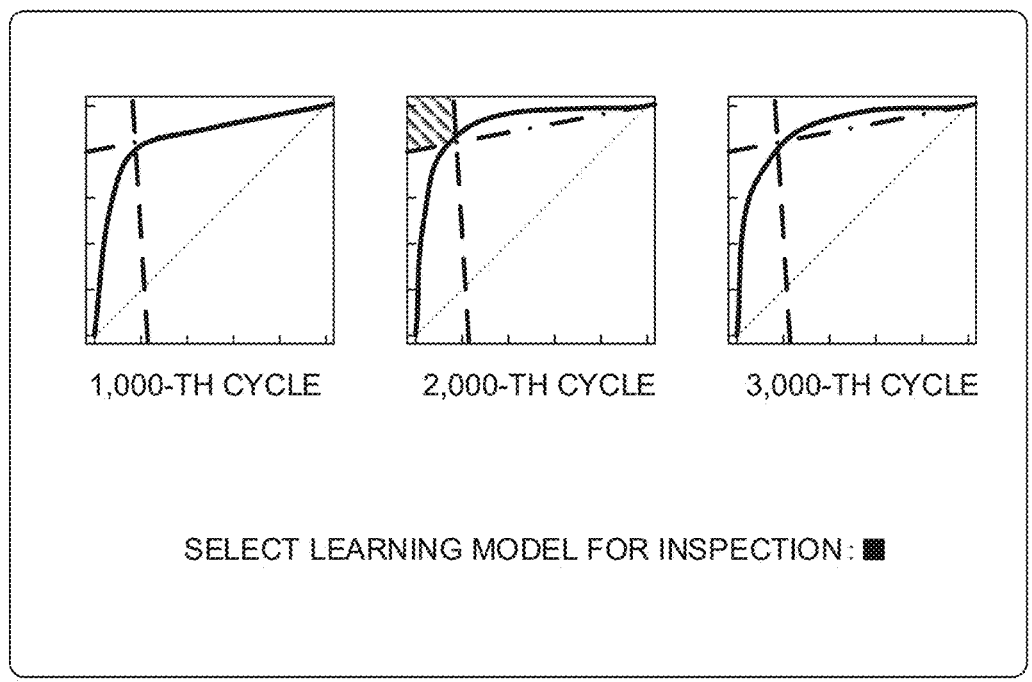
FIG. 5 is a diagram showing an example of learning model selection screen.

When a format of a graph form that displays respective index values of an ROC curve, a limit defective product shipping rate, and a limit re-inspection rate is set in advance as an index value comparison display form, the learning model selection unit 140 draws in a graph form an ROC curve as a learning model evaluation index and straight lines calculated from Formulas (1) and (2) on the basis of a limit defective product shipping rate and a limit re-inspection rate as inspection indexes for each learning model and displays the same on the display device 70. At this time, the learning model selection unit 140 may display the graphs related to the plurality of learning models side by side as exemplified in FIG. 5.

Figure 6:
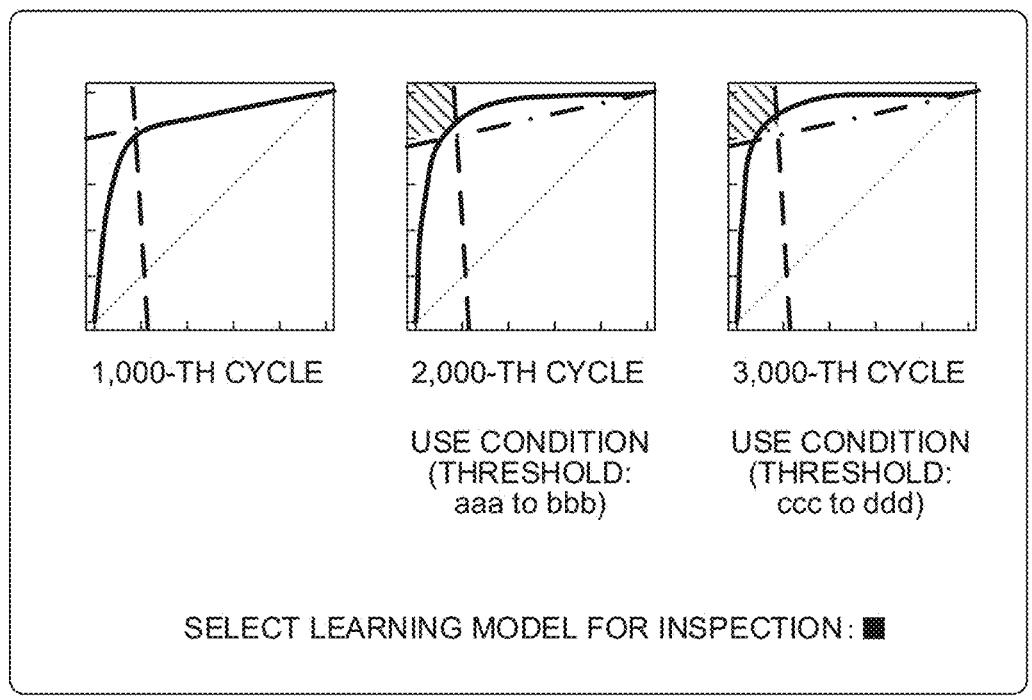
FIG. 6 is a diagram showing another example of the learning model selection screen.

Furthermore, the learning model selection unit 140 may display a condition under which a learning model is used in a state in which required specifications fixed as inspection indexes are satisfied, together with the comparison display between a learning model evaluation index and inspection indexes. In the above example, when a learning model determined to satisfy required specifications fixed as inspection indexes is used, a threshold corresponding to a portion in which an ROC curve enters a hatched region in FIG. 5 (the threshold of an output value of the learning model estimating an inspection target as being positive, i.e., a defective product) is required to be set and used. As exemplified in FIG. 6, the learning model selection unit 140 may output the range of the threshold to the display device 70 that displays the range together with the comparison display between the learning model evaluation index and the inspection indexes. In the range of the threshold, a threshold corresponding to a point at which the ROC curve crosses a chain line drawn by thick lines becomes an upper limit value, and a threshold corresponding to a point at which the ROC curve crosses a broken line drawn by thick lines becomes a lower limit value. Generally, the ROC curve is a line rising in an upper right direction. Therefore, the re-inspection rate becomes lower toward the upper limit value, and the defective product shipping rate becomes lower toward the lower limit value. The learning model selection unit 140 may also output this information.

In the inspection apparatus 1 including the above configurations, a learning model is evaluated on the basis of required specifications fixed as inspection indexes. Therefore, in the learning process of the machine learning device 300, even an operator on site having no knowledge about machine learning is allowed to determine whether learning has been performed to satisfy required specifications fixed as currently-set inspection indexes. As a result, the operator is allowed to easily select an appropriate learning model.

The embodiment of the present disclosure is described above. However, the present disclosure is not limited to the example of the above embodiment and may be performed in various aspects with the addition of appropriate modifications.

For example, in the above embodiment, the inspection apparatus 1 is described using an example of a shipping propriety determination through an appearance inspection. However, the inspection apparatus 1 may be appropriately applied to other inspections. For example, the inspection apparatus 1 may be applied to an inspection for determining a machining possibility with a machine tool, or the like. In this case, the inspection apparatus 1 may be configured to output, on the basis of temperature, vibration, sound, or the like at the time of the machining of the targeted machine, a score (a low score indicates that the operation of the machine tool is good, and a high score indicates that the machine tool is faulty or put into a state close to a fault) indicating the fault degree of the machine tool. At this time, in an ROC curve diagram generated by the inspection apparatus 1, a defective machine correct answer rate is set in a vertical axis, and a good movable machine incorrect answer rate is set in a horizontal axis. As inspection indexes handled by the inspection apparatus 1, it is sufficient to use, for example, a limit defective machining rate indicating the rate of defective machines practically allowed to be included in a group of machine tools determined to be normal and to be used in machining and a limit maintenance rate indicating the rate of machine tools determined to be abnormal and subjected to maintenance. By the setting of the parameters as described above, an appropriate learning model used in a scene to diagnose whether a machine tool is faulty is easily selected like the above embodiment.

The invention claimed is:

1. An inspection apparatus for performing an inspection of an inspection target, the inspection apparatus comprising:
a machine learning device configured to
receive state data acquired from the inspection target, and label data indicating an inspection result related to the inspection target,
create training data based on the state data and the label data, and
train and generate a neural network, as a learning model, by using the training data;
a learning model evaluation index calculation unit configured to calculate a learning model evaluation index related to the learning model generated by the machine learning device as an evaluation index to be used to evaluate the learning model;
an inspection index acquisition unit configured to acquire an inspection index to be used in the inspection; and
a learning model selection unit configured to
cause a display to display the learning model evaluation index and the inspection index so as to be comparable with each other regarding the learning model generated by the machine learning device,
receive selection of the learning model by an operator, and
output a result of the selection, wherein
the learning model selection unit is configured to cause the display to display graphs related to a plurality of learning models including the learning model in comparable view,
the learning model evaluation index includes a receiver operating characteristic (ROC) curve of the learning model generated by the machine learning device,
the inspection index includes a limit defective product shipping rate that indicates a rate of defective products allowed to be included in inspection targets to be shipped and a limit re-inspection rate that indicates a rate of the inspection targets excluded as a result of inspection to a total number of the inspection targets, and
each of the graphs includes, besides an ROC curve related to a corresponding learning model among the plurality of learning models, a first plot based on a first formula, the first formula is $F(f)=1-\{d\times(1-m)\times(1-f)\}/\{m\times(1-d)\}$, f represents a false positive rate,
d represents the limit defective product shipping rate, and
m represents a manufacturing defective rate being a number of defective products relative to the total number of the inspection targets.

2. The inspection apparatus according to claim 1, wherein the inspection index further includes a limit defective machining rate that indicates a rate of defective machines allowed to be included in a group of machine tools that are determined to be normal and are to be used in machining and a limit maintenance rate that indicates a rate of machine tools determined to be abnormal and subjected to maintenance.

3. The inspection apparatus according to claim 1, wherein the learning model selection unit is configured to calculate a condition under which the learning model satisfies the inspection index and output the calculated condition under which the learning model satisfies the inspection index.

4. A machine learning method comprising:
receiving state data acquired from an inspection target, and label data indicating an inspection result related to the inspection target;

creating training data based on the state data and the label data;
training and generating a neural network, as a learning model, by using the training data;
calculating a learning model evaluation index related to the learning model as an evaluation index used to evaluate the learning model;
acquiring an inspection index used in an inspection;
causing a display to display the learning model evaluation index and the inspection index so as to be comparable with each other regarding the generated learning model;
receiving selection of the learning model by an operator; and
outputting a result of the selection, wherein
in said causing the display to display, graphs related to a plurality of learning models including the learning model are displayed in comparable view,
the learning model evaluation index includes a receiver operating characteristic (ROC) curve of the learning model generated by the machine learning device, and
the inspection index includes a limit defective product shipping rate that indicates a rate of defective products allowed to be included in inspection targets to be shipped and a limit re-inspection rate that indicates a rate of the inspection targets excluded as a result of inspection to a total number of the inspection targets,
each of the graphs includes, besides an ROC curve related to a corresponding learning model among the plurality of learning models, a first plot based on a first formula, the first formula is $F(f)=1-\{d\times(1-m)\times(1-f)\}/\{m\times(1-d)\}$, f represents a false positive rate,
d represents the limit defective product shipping rate, and
m represents a manufacturing defective rate being a number of defective products relative to the total number of the inspection targets.

5. The inspection apparatus according to claim 1, wherein the label data indicate the inspection result obtained in response to the operator visually inspecting the inspection target.

6. The inspection apparatus according to claim 1, further comprising
a preprocessing unit configured to generate the state data based on image data on the inspection target captured by an image-capturing sensor, and
an inference unit configured to perform, based on the state data generated by the preprocessing unit, inference of the inspection result of the inspection target using the learning model selected by the learning model selection unit.

7. The inspection apparatus according to claim 1, wherein each of the graphs further includes a second plot based on a second formula, the second formula is $G(t)=\{r-(m\times t)\}/(1-m)$, t represents a true positive rate,
r represents the limit re-inspection rate, and
m represents the manufacturing defective rate.

8. The machine learning method according to claim 4, wherein
the label data indicate the inspection result obtained in response to the operator visually inspecting the inspection target.

9. The machine learning method according to claim 4, further comprising generating the state data based on image data on the inspection target captured by an image-capturing sensor, and
performing, based on the generated state data, inference of the inspection result of the inspection target using the selected learning model.

10. The machine learning method according to claim 4, wherein
each of the graphs further includes a second plot based on a second formula, the second formula is $G(t)=\{r-(m\times t)\}/(1-m)$, t represents a true positive rate,
r represents the limit re-inspection rate, and
m represents the manufacturing defective rate.

11. An inspection apparatus for performing an inspection of an inspection target, the inspection apparatus comprising:
a machine learning device configured to
receive state data acquired from the inspection target, and label data indicating an inspection result related to the inspection target,
create training data based on the state data and the label data, and
train and generate a neural network, as a learning model, by using the training data;
a learning model evaluation index calculation unit configured to calculate a learning model evaluation index related to the learning model generated by the machine learning device as an evaluation index to be used to evaluate the learning model;
an inspection index acquisition unit configured to acquire an inspection index to be used in the inspection; and
a learning model selection unit configured to
cause a display to display the learning model evaluation index and the inspection index so as to be comparable with each other regarding the learning model generated by the machine learning device,
receive selection of the learning model by an operator, and
output a result of the selection, wherein
the inspection apparatus is configured to perform inspection based on the selected learning model,
the learning model selection unit is configured to cause the display to display graphs related to a plurality of learning models including the learning model in comparable view,
the learning model evaluation index includes a receiver operating characteristic (ROC) curve of the learning model generated by the machine learning device,
the inspection index includes a limit defective product shipping rate that indicates a rate of defective products allowed to be included in inspection targets to be shipped and a limit re-inspection rate that indicates a rate of the inspection targets excluded as a result of inspection to a total number of the inspection targets, and
each of the graphs includes, besides an ROC curve related to a corresponding learning model among the plurality of learning models, a first plot based on a first formula, the first formula is $F(f)=1-\{d\times(1-m)\times(1-f)\}/\{m\times(1-d)\}$, f represents a false positive rate,
d represents the limit defective product shipping rate, and
m represents a manufacturing defective rate being a number of defective products relative to the total number of the inspection targets.

12. The inspection apparatus according to claim 11, wherein
the label data indicate the inspection result obtained in response to the operator visually inspecting the inspection target.

13. The inspection apparatus according to claim 11, further comprising
a preprocessing unit configured to generate the state data based on image data on the inspection target captured by an image-capturing sensor, and
an inference unit configured to perform, based on the state data generated by the preprocessing unit, inference of the inspection result of the inspection target using the learning model selected by the learning model selection unit.

14. The inspection apparatus according to claim 11, wherein
each of the graphs further includes a second plot based on a second formula,
the second formula is $G(t)=\{r-(m \times t)\}/(1-m)$,
t represents a true positive rate,
r represents the limit re-inspection rate, and
m represents the manufacturing defective rate.

* * * * *